J. C. MASON.
CHANGE GEAR MECHANISM.
APPLICATION FILED OCT. 30, 1915.
1,226,559.
Patented May 15, 1917.
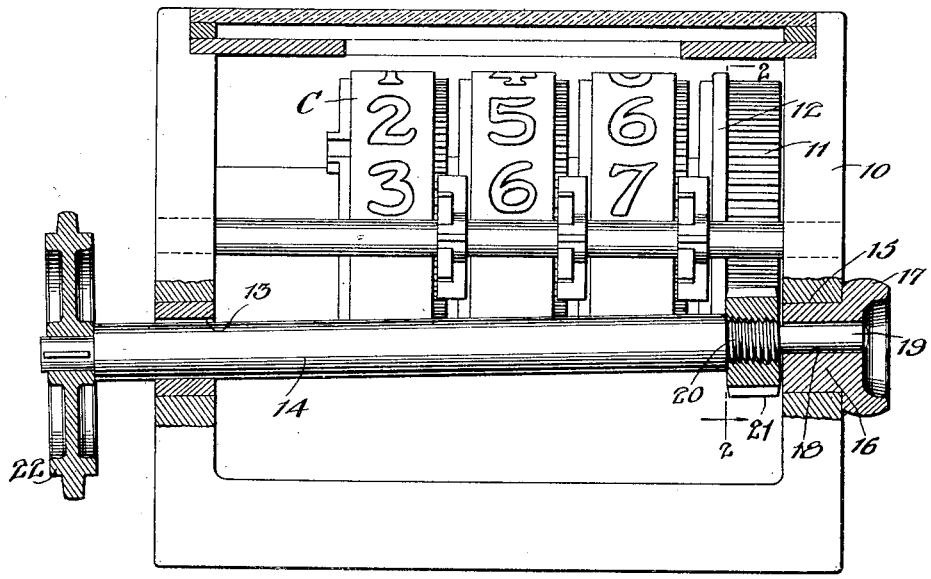
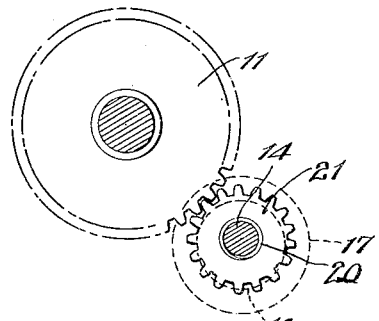
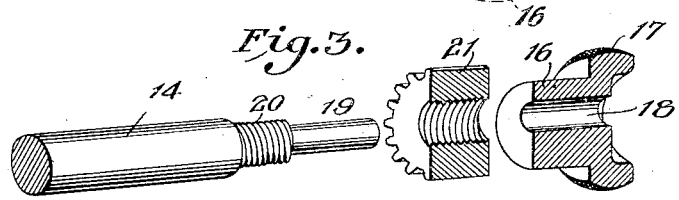
Inventor
John C. Mason
By Mason Fenwick & Lawrence,
Attorneys

UNITED STATES PATENT OFFICE.

JOHN C. MASON, OF SALISBURY, NORTH CAROLINA.

CHANGE-GEAR MECHANISM.

1,226,559.   Specification of Letters Patent.   Patented May 15, 1917.

Application filed October 30, 1915. Serial No. 58,884.

*To all whom it may concern:*

Be it known that I, JOHN C. MASON, a citizen of the United States, residing at Salisbury, in the county of Rowan and State of North Carolina, have invented certain new and useful Improvements in Change-Gear Mechanism; and I do hereby declare the following to be a full, clear, and exact description of the invention, such as will enable others skilled in the art to which it appertains to make and use the same.

This invention relates to machine elements, and more especially to gearing; and the object of the same is to provide means for manually changing one of a pair of intermeshing gears so as to substitute another of different size, and manually adjusting the position of the new gear so that it will mesh accurately with the one remaining.

This object is carried out by the mechanism hereinafter more fully described, reference being had to the accompanying drawings wherein—

Figure 1 is a front elevation of a counting mechanism partly in section, with this attachment applied thereto, Fig. 2 is a detail of the inter-meshing gears on the line 2—2 of Fig. 1, and Fig. 3 is a perspective detail of slightly separated parts, certain of them being in section.

I have shown my change gear mechanism as applied to a counter broadly indicated by the letter C in the drawing, and whose frame serves as a support for the bearings in which the gearing is mounted, but yet I do not wish to be limited to this application of the invention. The main or master gear of the counter C is hereinafter referred to as the driven gear, and its intermittent rotation turns the units wheel, the latter turning the tens wheel, and so on as usual. It frequently occurs that conditions arise where it is desired that the master wheel shall be turned to a greater or less degree, as when the rotations of a larger or smaller drum or member are to be counted; and in order to effect this change without altering the counting mechanism, I provide means for changing the driving or power gear and substituting another having a greater or less number of teeth. Either contingency requires that the shaft carrying the power gear be adjusted farther from or nearer to that carrying the driven or master gear, and that this shaft be so arranged that the power gear can be readily withdrawn therefrom and replaced by a new one. This, then, is the object of the invention as disclosed in the accompanying drawings.

The frame 10 has suitable bearings in which are journaled the various shafts of the counter C, and the master wheel 11 thereof has a flange 12 along that side which is opposite the end of the frame adjacent which this wheel stands. The ends of the frame also have bearings 13 and 15 alined with each other, the latter being a hole of considerable size in that end of the frame which is adjacent said master or driven gear. The main or power shaft 14 is loosely mounted in the bearing 13, adjacent which it is herein shown as provided with a sprocket wheel 22 adapted to be connected by a chain belt with the mechanism whose rotations are to be counted. Rotatably mounted in said bearing or hole 15 is a plug 16 having a knob or head 17 standing on the outside of the frame where it is readily accessible, and this plug carries a bearing 18 formed in it eccentric to its axis whereby the turning of the plug in the hole 15 will vary the position of the bearing itself. The shaft 14 has its tip 19 reduced and mounted in the eccentric bearing 18, and just inside the plug the shaft is threaded as at 20 for a short distance where it is larger than the reduced tip 19 but smaller than its body. On these threads is screwed a driving or power gear 21 which is shown in Fig. 1 as meshing with the master or driven gear 11.

It will be clear that when the plug is turned in the hole 15 to lower the eccentric bearing 18, the gear 21 will be adjusted away from the gear 11 and eventually thrown out of mesh with it and clear of its flange 12. To replace the power gear with one of different size having a different number of teeth, the operator holds the gear 21 and turns the shaft 14 in the proper direction to withdraw its threads 20 from the bore of such gear and unseat the tip 19 from the bearing 18 in the plug. The shaft is now moved to the left and withdrawn at least partly from the opposite bearing 13, another gear brought into position to replace the one removed, this gear having a number of teeth which is necessary for the conditions to be met, the gear passed over the tip 19 and onto the threads 20 and held while the shaft 14 is turned in the proper direction to connect it with said power gear while the latter stands between the flange 12 and the right end of frame 10. This movement projects the tip 19 into the bearing 18, and thereafter the plug 16 is turned by means of its knob 17 until the teeth of the new power gear are in accurate and yet not too tight mesh with the teeth of the driven gear. The flange now serves the function of holding the parts against dislodgment or displacement, as it held the former power gear, and the revolutions of the shaft 14 are recorded on the counter C in a slightly different manner according to the number of teeth on the power gear substituted.

What I claim is:

1. In a change gear mechanism, the combination with a frame having alined bearings in its opposite ends, and a driven gear having one side against one end of the frame and a flange at its other side; of a plug rotatably mounted in that bearing of the frame which is adjacent said gear and itself having an eccentric bearing and a head, a power shaft passing through the other bearing in the frame, reduced and threaded, and having a still further reduced smooth tip journaled in the eccentric bearing in said plug, and a power gear having a threaded bore of a size to pass over said tip and engage the threaded portion of said shaft, the gear standing between the inner face of the plug and the flange on said driven gear, for the purpose set forth.

2. In a change gear mechanism, the combination with a frame having bearings in its opposite ends, and a driven gear mounted in said frame; of a plug rotatably mounted in that bearing which is adjacent the driven gear and itself having an eccentric bearing, a shaft passing through the other bearing in the frame and having its tip reduced and journaled in the eccentric bearing in the plug, a power gear having a bore of a size to pass over said tip and engage the shaft adjacent thereto, and means for holding it removably in place thereon, for the purpose set forth.

In testimony whereof I affix my signature in presence of two witnesses.

JOHN C. MASON.

Witnesses:
  T. E. WITHERSPOON,
  H. E. RUFTY.

Copies of this patent may be obtained for five cents each, by addressing the "Commissioner of Patents, Washington, D. C."